United States Patent
Soma (10) Patent No.: US 8,922,566 B2
(45) Date of Patent: Dec. 30, 2014

(54) RECHARGEABLE UNIVERSAL SERIAL BUS EXTERNAL GRAPHICS DEVICE AND METHOD

(75) Inventor: Srinivas Soma, Hyderabad (IN)

(73) Assignee: NVIDIA Corporation, Santa Clara, CA (US)

( * ) Notice: Subject to any disclaimer, the term of this patent is extended or adjusted under 35 U.S.C. 154(b) by 548 days.

(21) Appl. No.: 12/824,423

(22) Filed: Jun. 28, 2010

(65) Prior Publication Data
US 2011/0316865 A1    Dec. 29, 2011

(51) Int. Cl.
G06F 13/14    (2006.01)
G06T 1/60    (2006.01)
G06F 13/38    (2006.01)

(52) U.S. Cl.
CPC ................... *G06F 13/385* (2013.01)
USPC .......................... 345/520; 345/530

(58) Field of Classification Search
USPC ........................... 710/2, 8; 345/505, 520, 530
See application file for complete search history.

(56) References Cited

U.S. PATENT DOCUMENTS

| | | | | |
|---|---|---|---|---|
| 5,949,438 | A * | 9/1999 | Cyman et al. | 345/502 |
| 6,507,172 | B2 * | 1/2003 | Sherman | 320/134 |
| 2006/0171689 | A1 * | 8/2006 | Smith | 386/125 |
| 2008/0117220 | A1 * | 5/2008 | Gorchetchnikov et al. | 345/503 |
| 2009/0141894 | A1 * | 6/2009 | Sahdra et al. | 380/239 |
| 2009/0144456 | A1 * | 6/2009 | Gelf et al. | 710/8 |
| 2010/0091025 | A1 * | 4/2010 | Nugent et al. | 345/502 |

OTHER PUBLICATIONS

Reimer, Coming Soon: An External Video Card Near You?, ARS Technica (http://arstechnica.com/uncategorized/2006/08/7409/) (Aug. 2, 2006).*
White, NVIDIA Announces Quadro Plex, Monster Graphics for Pros, http://gizmodo.com/191187/nvidia-announces-quadro-plex-monster-graphics-for-pros, Gawker Media (Aug. 1, 2006).*
NVIDIA Quadro Plex 1000 Installation Guide, DI-02500-001_V03, NVIDIA Corporation (2007).*

* cited by examiner

*Primary Examiner* — James A Thompson
(74) *Attorney, Agent, or Firm* — Zilka-Kotab, PC (57) ABSTRACT

A graphics processing device that is portable, reconfigurable and provides graphics processing for a computer system is provided. The graphics processing device includes a Universal Serial Bus (USB) interface coupled with the graphics processor and configured to be coupled with computer system. The graphics processing device further includes the USB interface configured to transfer a graphics instruction, originated by the computer system, to the graphics processor. The graphics processing device may further include a battery coupled with the graphics processor to partially power the graphics processor. The battery may be rechargeable. The graphics processor may be configured to process graphics instruction on behalf of the computer system. A portable processing system to provide processing for a computer system is also disclosed. The portable processing system may include a processor. The portable processing system may include a USB module coupled with processor and configured to be coupled with computer system.

20 Claims, 6 Drawing Sheets

RECHARGEABLE UNIVERSAL SERIAL BUS EXTERNAL GRAPHICS DEVICE AND METHOD

FIELD OF TECHNOLOGY

This disclosure relates generally to graphics acceleration technology. More particularly, this disclosure relates to a rechargeable universal serial bus external graphics device and method.

BACKGROUND

An external graphics device (e.g., an external graphics card) may consume a significant amount of power when coupled with a data processing system through a Peripheral Component Interconnect Express (PCI-e) slot. The significant amount of power may be consumed because the external graphics device may perform process incentive graphics tasks. Furthermore, the PCI-e slot may be slow when compared to other approaches.

SUMMARY

Disclosed are rechargeable universal serial bus external graphics device and method.

In one aspect, the rechargeable universal serial bus external graphics device referred to herein after as graphics processing device may be portable and may provide graphics processing for a computer system. The graphics processing device includes a graphics processor. The graphics processing device also includes a universal serial bus (USB) interface that is communicatively coupled with the graphics processor and is configured to be communicatively coupled with the computer system. In one or more embodiments, the USB interface may utilize a USB 3.0 protocol. The graphics processing device further includes the USB interface being further configured to transfer a graphics instruction, originated by the computer system, to the graphics processor. The graphics processor may be configured to process the graphics instruction on behalf of the computer system. The graphics processor may also be configured to transfer a result of processing the graphics instruction to the computer system, using the USB interface.

The graphics processing device may further include a battery coupled with the graphics processor, and configured to partially power the graphics processor to process the graphics instruction. The battery may be rechargeable. The battery may be a lithium ion battery. The battery may be user-attachable with the graphics processing device and user-detachable from the graphics processing device such that the battery is field replaceable. The graphics instruction associated with a graphics application may be operated by the computer system.

In another aspect, a portable processing system to provide processing for a computer system is disclosed. The portable processing system may include a processor. The portable processing system may also include a battery coupled with the processor and configured to provide power to the processor. The battery may be configured to at least partially power the processor to process the instruction. The battery may be user-detachable from the portable processing system and user-attachable with the portable processing system. The battery may be rechargeable. The battery may be a lithium ion rechargeable battery.

The portable processing system may also include a USB module communicatively coupled with the processor and may be configured to be communicatively coupled with the computer system. The USB module may be configured to transfer an instruction, which was originated by the computer system, to the processor. The processor may be configured to process the instruction on behalf of the computer system. The processor may transfer a result of the processed instruction to the computer system, using the USB module. The processor may include a graphics processor, and the portable processing system may be configured to provide auxiliary graphics processing for the computer system. The instruction may include a graphics instruction associated with a graphics application operated by the computer system.

In yet another aspect, a graphics processing system includes a computer system. The computer system includes one or more system processors. The computer system also includes a memory coupled with one or more system processors. The computer system further includes a video display device configured to display graphical data generated by one or more system processors. The computer system furthermore includes a first USB interface coupled with one or more system processors, and an audio device configured to generate audio data generated by one or more system processors. The graphics processing system also includes a graphics processing device communicatively coupled with the computer system using a USB cable. The graphics processing device may include one or more graphics processors. The graphics processing device may also include a second USB interface communicatively coupled with one or more graphics processors and configured to communicatively couple the first USB interface with the second USB interface using the USB cable.

The second USB interface may be configured to receive a graphics instruction that is encoded by a USB 3.0 communication protocol from the computer system via the USB cable. The second USB interface may also be configured to provide the graphics instruction for one or more graphics processors. One or more graphics processors may be configured to process the graphics instruction on behalf of the computer system. The graphic processor may also be configured to transfer a result of the processed graphics instruction to the computer system, using the second USB interface. The graphics processing device may further include a rechargeable battery that may be removably coupled with one or more graphics processors and may be configured to be field replaceable. The rechargeable battery may be configured to partially power one or more graphics processors when one or more graphics processors process the graphics instruction. The graphics processors may include one or more multi-core processors.

In yet another aspect a method includes indicating to a computer system, that a graphics processing device is active. The computer system may be indicated by utilizing a Universal Serial Bus (USB) protocol. The graphics processing device may be portable by a user. The method also includes acquiring a graphics instruction from the computer system, based at least in part on the indicating that the graphics processing device is active. The graphics instruction may be acquired by utilizing the USB protocol. The method further includes processing the acquired graphics instruction using a graphics processor within the graphics processing device. The method furthermore includes using energy supplied by a rechargeable battery to process the acquired graphics instruction. The rechargeable battery may form a portion of the graphics processing device. The method furthermore includes transferring to the computer system, utilizing the USB protocol, a result of the processing of the acquired graphics instruction. In one or more embodiments, the acquiring of the graphics instruction utilizing the USB protocol may include acquiring the graphics instruction utilizing a USB 3.0 protocol. In one or more embodiments, transferring the result of the processing of the acquired graphics instruction includes utilizing the USB 3.0 protocol. In one or more embodiments, the energy in the rechargeable battery may be stored prior to the supplying the energy.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a rechargeable universal serial bus external graphics device and method.

Although the present embodiments have been described with reference to specific example embodiments, it will be evident that various modifications and changes may be made to these embodiments without departing from the broader spirit and scope of the various embodiments.

Figure 1:
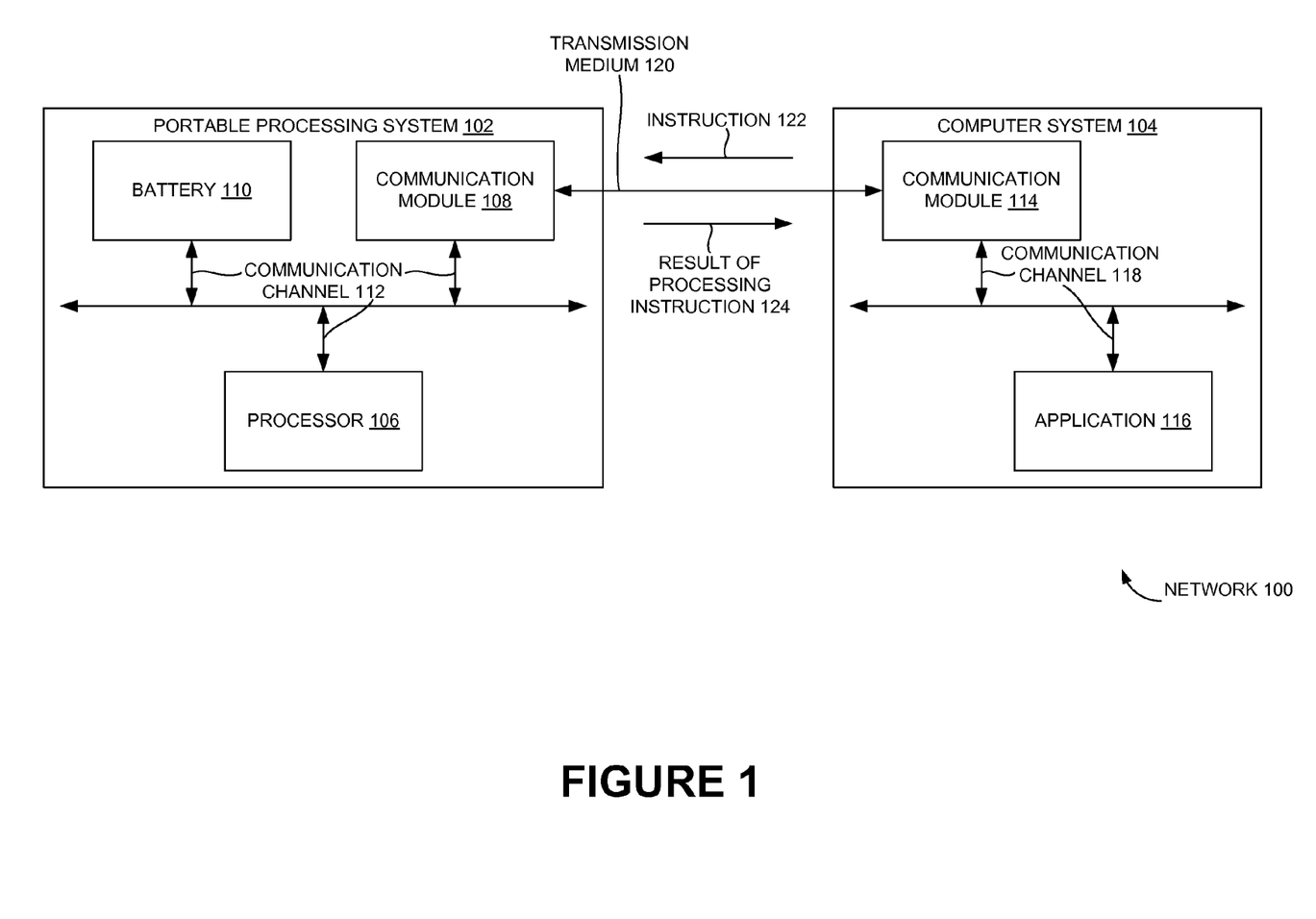
FIG. 1 is a block diagram, showing an example network including an example portable processing system and an example computing system, in accordance with an example embodiment.

FIG. 1 is a block diagram, showing an example network 100 including an example portable processing system 102 and an example computing system 104, in accordance with an example embodiment. The example network 100 may include, but is not limited to a wired network or a wireless network. The example network 100 may be implemented with an appropriate communication protocol including, but not limited to a universal serial bus (USB), an internet protocol (IP), Wi-Fi, worldwide interoperability for microwave access (Wimax), a fibre channel over ethernet (FCoE), a wireless application protocol (WAP) or a combination therein. In one or more embodiments, the portable processing system 102 (e.g., a graphics processing system) may be configured to process one or more instructions on behalf of the computer system 104. Examples of the computer system 104 may include, but is not limited to, a desktop, a laptop, a handheld device, and/or a computer system that does not include a graphics processor. The computer system 104 may include one or more system processors (e.g., central processing unit (CPU) and/or a memory (e.g., random access memory (RAM), read only memory (ROM) coupled with one or more of the processors.

In one or more embodiments, the computer system 104 may also include a video display device configured to display graphical data generated by one or more system processors. The computer system may further include a first USB interface coupled with one or more system processors. Furthermore, the computer system may also include an audio device configured to generate audio data generated by one or more system processors. In one or more embodiments, the portable processing system 102 includes a processor 106 (e.g., a graphics processor). The processor 106 may be a general purpose processor or a special purpose processor. In one or more embodiments, the processor 106 may include a multi-core processor. In one or more embodiments, the processor 106 may include, for example a graphics processor. In one or more embodiments, the portable processing system 102 may be configured to provide auxiliary graphics processing for the computer system 104. In one or more embodiments, the portable processing system 102 further includes a battery 110 coupled with the processor 106 and configured to provide power to the processor 106.

Further, in one or more embodiments, the portable processing system 102 also includes a communication module 108 (e.g., a USB module) communicatively coupled with the processor 106 and configured to be communicatively coupled with the computer system 104. In one or more embodiments, the communication module 108 (e.g., a USB module) may utilize a USB 3.0 protocol to communicate with the computer system 104. The communication module 108 may be configured to transfer an instruction 122 that was originated by the computer system 104, to the processor 106. The instruction 122 may include, for example a graphics instruction associated with a graphics application operated by the computer system 104. The communication module 108 may also be configured to receive, process, and/or transmit data using one or more network communication protocols (e.g., IP, transmission control protocol (TCP), and the like). The communication module 108 may be further be configured to translate to/or from the network communication protocol of the processor 106.

Examples of the network communication protocols may include, but are not limited to USB, Wi-Fi, WiMax, PCI-e, and the like. The processor 106 may be configured to process the instruction 122 on behalf of the computer system 104 and transfer a result of the processed instruction 124 to the computer system 104 through the communication module 108. The communication module may include one or more interfaces (e.g., a USB interface). In an example embodiment, the portable processing system 102 may include a first interface and a second interface. Examples of the first interface may include, but not limited to a USB interface. The second interface (e.g. a USB interface) may be communicatively coupled with one or more of the processors (e.g., processor 106). The second interface may be configured to communicatively couple the first interface with the second interface using a communication medium (e.g., a USB cable). In one or more embodiments, the battery 110 may be configured to partially power the processor 106 to process the instruction 122.

Further, the second interface may be configured to receive a graphics instruction from the computer system 104. The graphic instruction may be encoded by a communication protocol (e.g. a USB 3.0) from the computer system 104. Further, the second interface may also be configured to provide graphic instruction to the processor 106. In one or more embodiments, the battery 110 may be user-detachable from the portable processing system 102 and/or user-attachable with the portable processing system 102. The battery 110 may be rechargeable or non-rechargeable. The rechargeable battery may be further configured to partially power one or more of the processors when one or more of the processors processes an instruction (e.g. a graphic instruction) or when the computer system 104 fails to supply power to the portable processing system 102 (e.g., on event of power failure when the computer system 104 is devoid of a back-up power source).

Examples of the battery 110 may include, but is not limited to a lead acid battery, a nickel cadmium (NiCd) battery, nickel metal hydride (NiMH) battery, a lithium ion (Li-ion) battery, and lithium ion polymer (Li-ion polymer) rechargeable battery, and the like. Consider, for example, if an application 116 running on the computer system 104 requires the processing capabilities of the portable processing system 102. The application 116 may include, for example, a graphics application including for example a video game, or other graphics application. A communication module 114 of the computer system 104 may interact with the application 116 through a communication channel 118.

The communication module 114 may transfer a data associated with the application 116 to be processed through the portable processing system 102, to the USB module 108 through the transmission medium 120. The transmission medium 120 may include, for example, a USB cable, a data cable, a wireless network, and the like. The USB module 108 may transfer the data to be processed to the processor 106 through the communication channel 112 of the portable processing system 102. The processor 106 may process the data and transfer a result of processing instruction 124 to the USB module 108. The USB module 108 may transfer the result of processing instruction 124 to the communication module 114 of the computer system 104.

Figure 2:
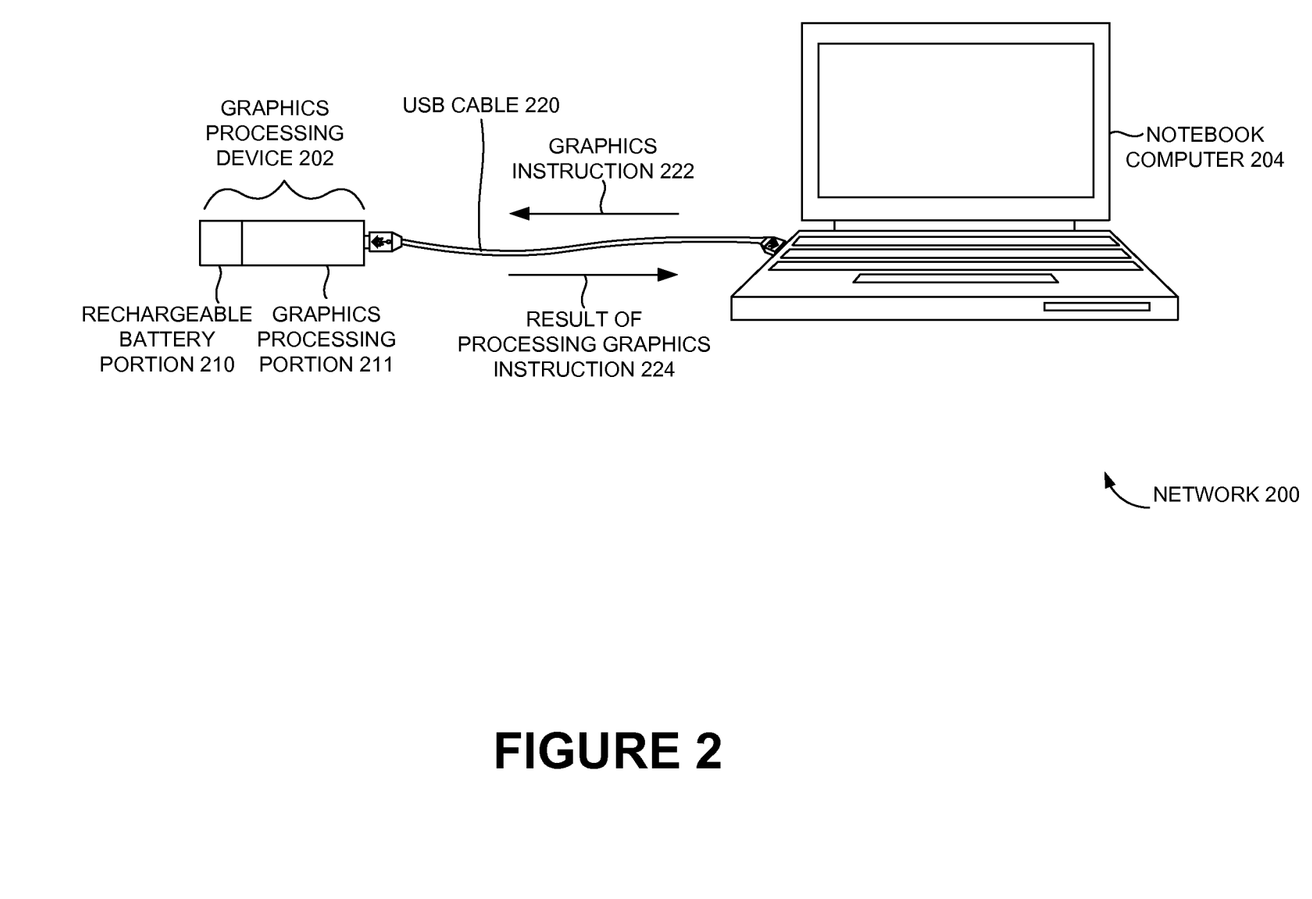
FIG. 2 a block diagram, showing an example network including an example graphics processing device and a notebook computer, in accordance with an example embodiment.

FIG. 2 a block diagram, showing an example network 200 including an example graphics processing device 202 and a notebook computer 204, in accordance with an example embodiment. The term graphics processing device 202 may be used interchangeably with the term rechargeable USB external graphics device. In one or more embodiments, the graphics processing device 202 is portable and provides graphics processing for a computer system 104. The graphics processing device 202 includes a graphics processor. In one or more embodiments, the graphics processing device 202 may also include a USB interface (not shown) communicatively coupled with the graphics processor and may be configured to be communicatively coupled with the computer system 104. For the purpose of illustration the detailed description may refer to the USB interface; however the scope of the graphics processing system disclosed herein is not limited to the USB interface but may be extended to include any known generic communication interface of a computing system. In one or more embodiments, the USB interface may further be configured to transfer a graphics instruction, originated by the computer system 104, to the graphics processing device 202.

In one or more embodiments, the USB interface may utilize a USB 3.0 protocol to transfer data. The graphics instruction associated with a graphics application may be operated by the computer system 104. The graphics processor may be configured to process the graphics instruction on behalf of the computer system. The graphics processor may also be configured to transfer a result of processing the graphics instruction to the computer system 104, using the USB interface. The graphics processing device 202 may further include a battery coupled with the graphics processor, and configured to at least partially power the graphics processor to process the graphics instruction. In one or more embodiments, the battery may be rechargeable and may be housed in a rechargeable battery portion 210 of the graphics processing device 202. The battery may be a lithium ion battery. The battery may be user-attachable with the graphics processing device and/or user-detachable from the graphics processing device such that the battery is field replaceable. The battery may be recharged by using power from the computer system 104 (e.g., notebook computer 204). The graphics processor may be housed in a graphics processing portion 211 of the graphics processing device 202.

Figure 3:
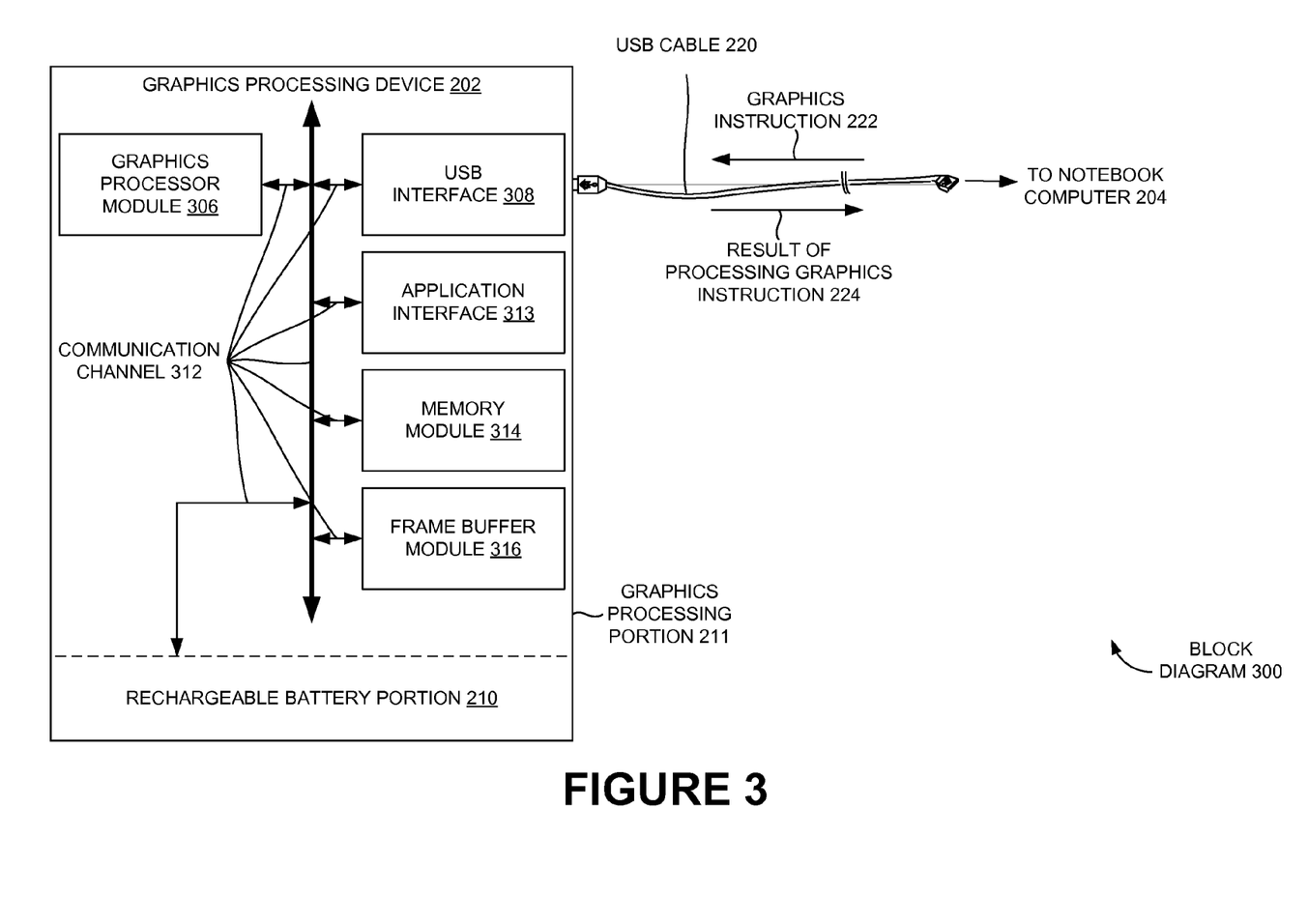
FIG. 3 is a block diagram illustrating the example graphics processing device of FIG. 2, in accordance with an example embodiment.

FIG. 3 is a block diagram illustrating the example graphics processing device 202 of FIG. 2, in accordance with one or more embodiments. In the example embodiment of FIG. 3, the graphics processing device 202 may have a modular architecture allowing disintegration of one or more functional modules within the graphics processing device 202. The functional modules may include, but is not limited to, a graphics processor module 306, a memory module 314, a frame buffer module 316, and the like. The modularization allows replacement of the functional modules and customization of the graphics processing device 202 to upgrade functionalities of the graphics processing device 202. Further, replaceability of the functional modules allows upgrading individual functional modules without the need to replace whole of the graphics processing device 202. The replaceability of the functional modules also allows mix and match of various components (e.g., processor, memory, and the like) of the functional modules. In one or more embodiments, the modular architecture may be implemented using one or more standard interfaces between modules that allow specification of a desired inter-modular behavior, verification that the behavior is as designed, and predictability that the correct behavior will always occur.

In one or more embodiments, an open interface standard may be implemented in the graphics processing device 202 to strengthen compatibility and interoperability of the functional modules from different vendors. In one or more embodiments, the modular architecture may be implemented by separately mounting different functional modules at different sections of a motherboard and by interconnecting the different sections through one or more physical interfaces. In one or more embodiments, the motherboard may have one or more base sockets to receive pins on the functional modules and to provide interconnection between the various functional modules. Each functional module may be an integrated circuit and may house one or more of a processor circuitry, a memory circuitry, and a similar desired circuitry to provide a desired functionality. Each functional module may have a separate base socket to allow replacement of the functional modules.

In one or more embodiments, the graphics processor module 306 may include a graphics processor and a communication interface to allow communication among the replaceable functional modules of the graphic processing device. The modularization renders the functional modules to be replaceable and thereby renders the graphics processing device 202 to be reconfigurable without the need to replace whole of the graphics processing device 202. The graphics processing device 202 could be, for example, an external graphics card. In one or more embodiments, the memory module 314 may include a memory (e.g., double data rate three synchronous dynamic random access memory (DDR3 SDRAM™)) and/or an interface to allow communication with other functional modules of the graphic processing device 202. In one or more embodiments, the memory may also include an operating system (e.g., Android™, Linux™, Microsoft®'s Windows™) of the graphics processing device 202 resident therein. Also, in one or more embodiments, the frame buffer module 316 may include a frame buffer and/or an interface to allow communication with other functional modules of the graphic processing device 202.

If one or more processing capabilities of the graphics processing device 202 need to be enhanced, one or more of the functional modules in the graphics processing device 202 can be replaced with one or more new processing modules with required processing capabilities (e.g., a faster processing capability) without removing the whole of the graphics processing device 202. For example, a 2 gigabyte (GB) memory chip of the graphics processing device may be removably mounted on the motherboard of the graphics processing device 202. If the memory of the graphics processing device needs to be enhanced to a 4 GB memory due to requirements of a graphics application to be processed through the graphics processing device 202, then the 2 GB memory chip may be replaced with a 4 GB memory chip. The pins of the 4 GB memory chip may match the pins of the 2 GB memory chip so as to mount the 4 GB memory chip on a base socket where the 2 GB memory chip was previously mounted, without having to replace the whole of the graphics processing device 202 for up gradation.

Further, it may be economically feasible from the perspective of a user to replace one or more of the functional modules within the graphics processing device 202 instead of replacing whole of the graphics processing device 202, whenever a need to upgrade the capabilities of graphics processing device 202 arises. In addition, in one or more embodiments, the graphics processing device 202 may also include a USB interface 308 to allow the graphics processing device 202 to communicate with a computer system (e.g. notebook computer 204) through a USB cable 220. In one or more embodiments, a graphics instruction 222 may be transferred from the notebook computer 204 to the graphics processing device 202 through the USB cable 220. The USB interface 308 may be configured to receive the graphics instruction 222 and communicate the received instruction to the graphics processor module 306 through a communication channel 312. The graphics processor module may process the graphics instruction and a result 224 of the processing may be transferred to the computer system (e.g. notebook computer 204) through the USB cable 220 as illustrated in FIG. 3.

In one or more embodiments, the graphics processing device 202 may further include an application interface 313. The application interface 313 may facilitate the processing of instructions (e.g., graphical instruction) on behalf of a computer system (e.g., the notebook computer 204) requesting auxiliary processing from a portable processing system (e.g., the graphics processing device 202). Although the example application interface 313 is shown to be located on the graphics processing device 202 in FIG. 3, the example application interface 313 may be located elsewhere (e.g., external to the graphics processing device 202) without departing from the claimed subject matter. In an example embodiment, the application interface 313 may be located on the notebook computer 204.

In some example embodiments, the graphics processing device 313 and the notebook computer device 204 may share in facilitating the processing of instructions. In some example embodiments, some or all of the functionality of the application interface 313 may be provided external to the graphics processing device 202 and/or the computer system 104 (e.g., notebook computer 204). In one or more embodiments, the graphics processing device 202 of FIG. 2 may periodically indicate to the notebook computer 204 of FIG. 2, that the graphics processing device 302 is activated to process graphics instructions on behalf of the notebook computer 204 of FIG. 2. In various example embodiments, the graphics processing device 202 may use the USB interface 308 of FIG. 3 and the USB cable 220 of FIG. 2, to indicate the active state. In an example embodiment, subsequent to indicating the active state of the graphics processing device 202, the application interface 313 of FIG. 3 may receive a processing request from the notebook computer 204 of FIG. 2. In an example embodiment, the application interface 313 of FIG. 3 may coordinate the processing of a graphics instruction by the graphics processor 306. In some example embodiments, the application interface 313 of FIG. 3 may be implemented with software (e.g., drivers) or in other example embodiments with hardware, and in yet further embodiments, the application interface 313 may be implemented using a combination of hardware and software. The operation of the application interface 313 is discussed in further detail below with respect to FIG. 5.

Figure 4:
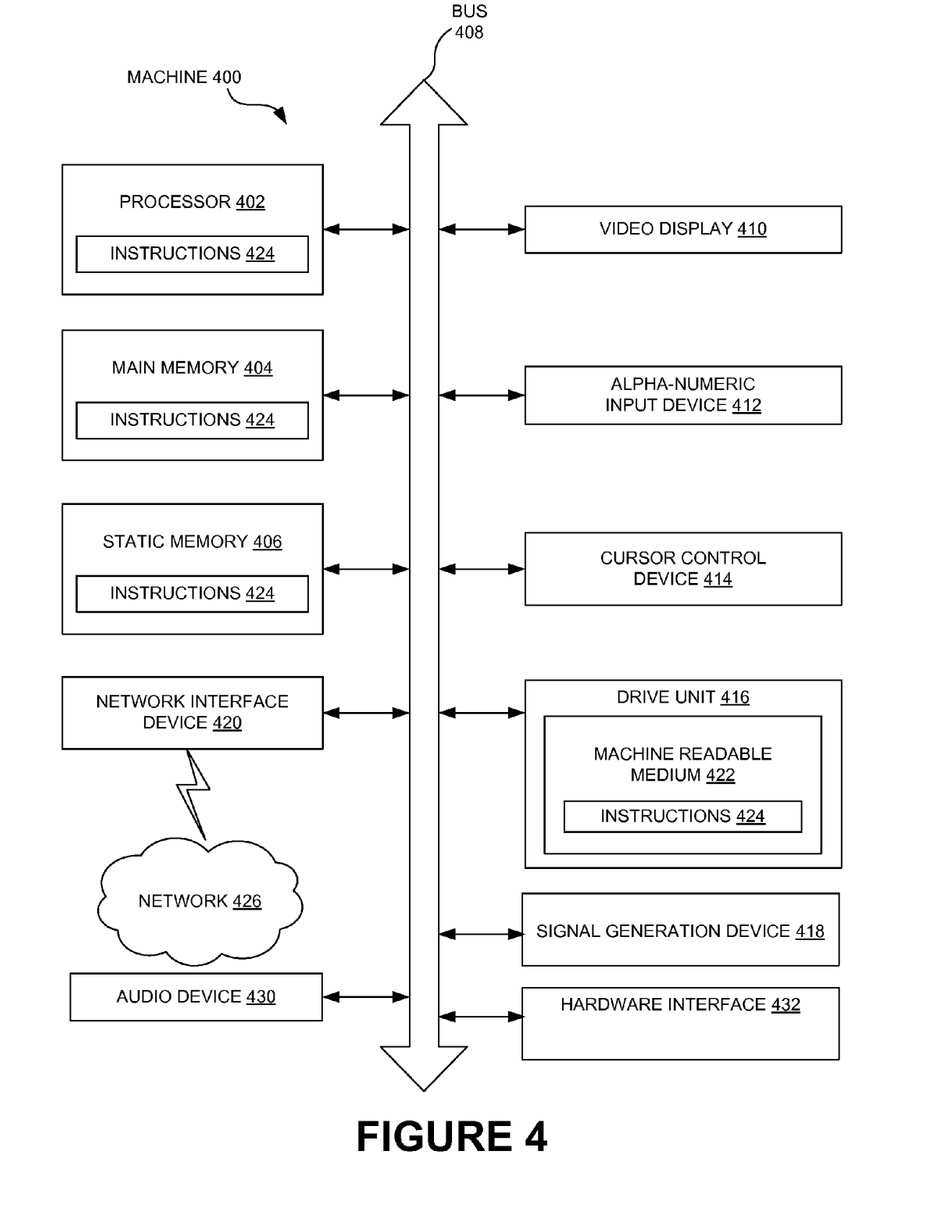
FIG. 4 is a block diagram showing an example machine, in accordance with an example embodiment.

FIG. 4 is a block diagram showing an example machine 400, in accordance with an example embodiment. In one or more embodiments, the machine 400 is an example form of a computer system 104, within which a set of instructions, for causing the machine 400 to perform any one or more of the methodologies discussed herein, may be executed. In various embodiments, the machine 400 may operate as a standalone device and/or may be connected (e.g., networked) to other machines. In a networked deployment, the machine 400 may operate in the capacity of a server and/or a client machine in server-client network environment, and/or as a peer machine in a peer-to-peer (or distributed) network environment. The machine 400 may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by the machine 400. Further, while only a single machine is illustrated, the term "machine" shall also be taken to include any collection of machines that individually and/or jointly execute a set (or multiple sets) of instructions to perform any one and/or more of the methodologies discussed herein.

The example computer system 104 includes a processor 402 (e.g., a central processing unit (CPU) a graphics processing unit (GPU) and/or both), a main memory 404 and a static memory 406, which communicate with each other via a bus 408. The computer system 104 may further include a video display unit 410 (e.g., a liquid crystal display (LCD) and/or a cathode ray tube (CRT)). The computer system 104 also includes an alphanumeric input device 412 (e.g., a keyboard), a cursor control device 414 (e.g., a mouse), a disk drive unit 416, a signal generation device 418 (e.g., a speaker) and a network interface device 420. The disk drive unit 416 includes a machine-readable medium 422 on which is stored one or more sets of instructions (e.g., software 424) embodying any one or more of the methodologies and/or functions described herein.

The software 424 may also reside, completely and/or at least partially, within the main memory 404 and/or within the processor 402 during execution thereof by the computer system 104, the main memory 404 and the processor 402 also constituting machine-readable media. The software 424 may further be transmitted and/or received over a network 426 via the network interface device 420. Further, in one or more embodiments, the machine 400 may also include an audio device 430 configured to generate audio data generated by the processor 402. In one or more embodiments, the machine 400 may also include a hardware interface (e.g. a USB interface) for communicatively coupling one or more peripheral devices (e.g. a graphics processing device 202) with the machine 400.

While the machine-readable medium 422 is shown in an example embodiment to be a single medium, the term "machine-readable medium" should be taken to include a single medium and/or multiple media (e.g., a centralized and/or distributed database, and/or associated caches and servers) that store one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 5:
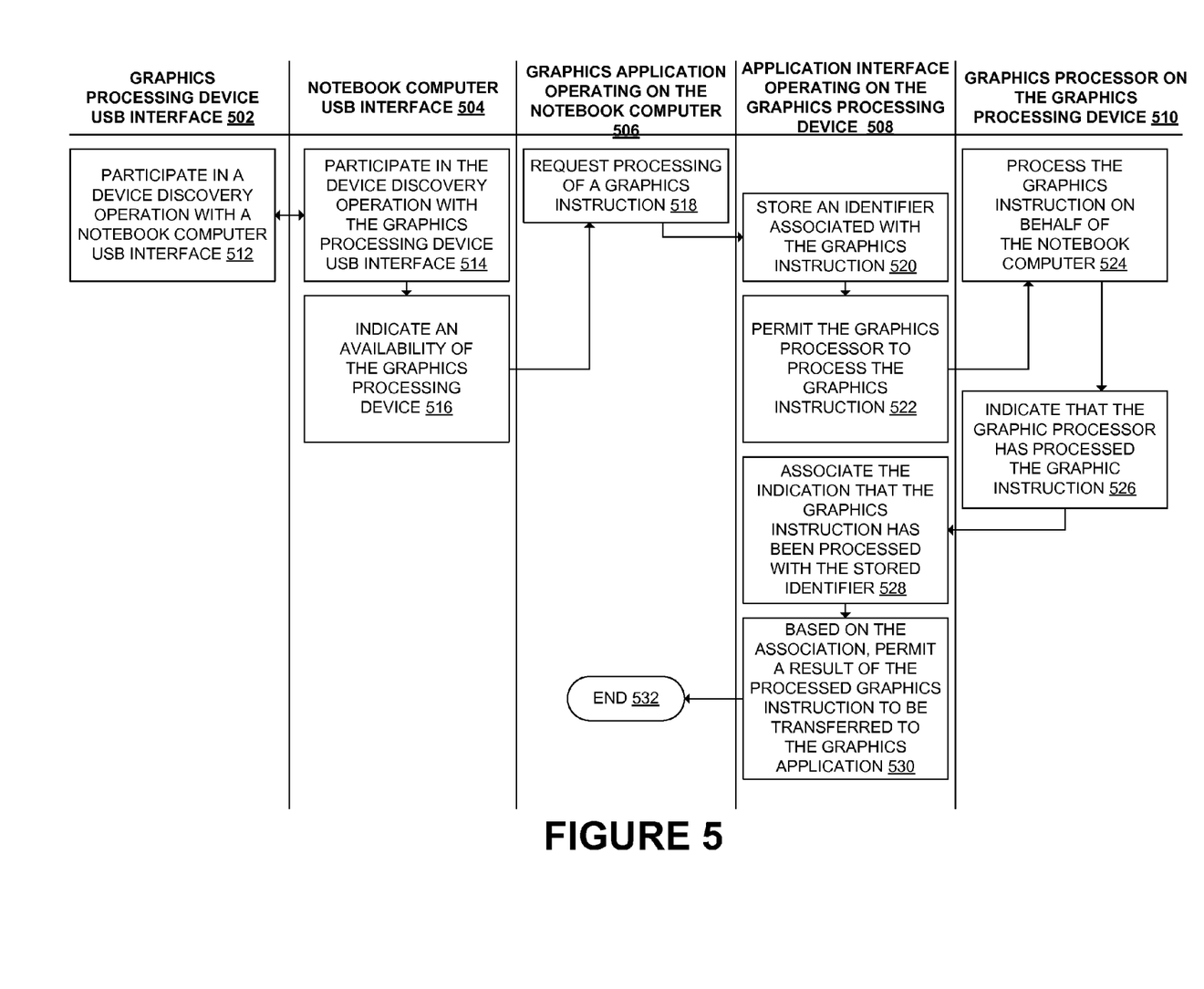
FIG. 5 is an interaction diagram, illustrating example interactions involving components of an example graphics processing system, in accordance with an example embodiment.

FIG. 5 is an interaction diagram, illustrating example interactions involving components of an example graphics processing system. As illustrated in FIG. 5, at step 512, a user interface 502 of a graphics processing device 202 in the example graphics processing system participates in a device discovery operation with a USB interface 504 of a notebook computer. During the device discovery, the graphics processing device 202 may indicate to a computer system 104, that the graphics processing device 202 is active. In one or more embodiments, the graphics processing device 202 may be portable by a user and the indication may be made using a USB protocol. For example, referring to FIG. 2, the graphics processing device 202 may indicate to the notebook computer 204 that the graphics processing device 202 is active and ready to process graphics instructions (e.g., on behalf of the notebook computer 204).

In one or more embodiments, in step 514, the USB interface 504 of the notebook computer participates in device discovery with the user interface 512 of the graphics processing device. For example, referring again to FIG. 2, the graphics processing device 202 of FIG. 2 may provide the indication that the graphics processing device 202 is active to the notebook computer 204 over the USB cable 220. Further in step 516, the USB interface 504 of the notebook computer indicates availability of the graphics processing device to the notebook computer. In one or more embodiments, at step 518, a graphics application 506 running in the notebook computer requests processing a graphics instruction through an application interface 508.

For example, referring to FIG. 3, when a graphics instruction 222 needs to be processed through the graphics processing device 202 on behalf of the notebook computer 204, the notebook computer transfers the graphics instruction 222 through the USB cable 220 to the USB interface 308 of the graphics processing device 202. The graphics instruction 222 may then be transferred to the application interface 313 that mediates between the graphics processor module 306 and the notebook computer 204. At step 520, the application interface 508 stores an identifier associated with the graphics instruction. Referring to FIG. 3 again, the identifier may be stored in, for example, the memory within the memory module 314 of the graphics processing device 202. Further, at step 522, the application interface 508 permits graphics processor to process the graphics instruction.

Furthermore at step 524, a graphics processor 510 coupled to the notebook computer 204 processes the graphics instruction on behalf of the notebook computer 204. Furthermore, on completion of processing, at step 526, the graphics processor 510 indicates that the graphics processor 510 has processed the graphics instruction. At step 528, on receiving the indication from the graphics processor 510, the application interface 508 associates the indication that the graphics instruction has been processed with the stored identifier. Furthermore, at step 530, the application interface 508, permits a result of the processed graphics instruction to be transferred to the graphics application based on the association of the indication. The process ends at step 532.

Figure 6:
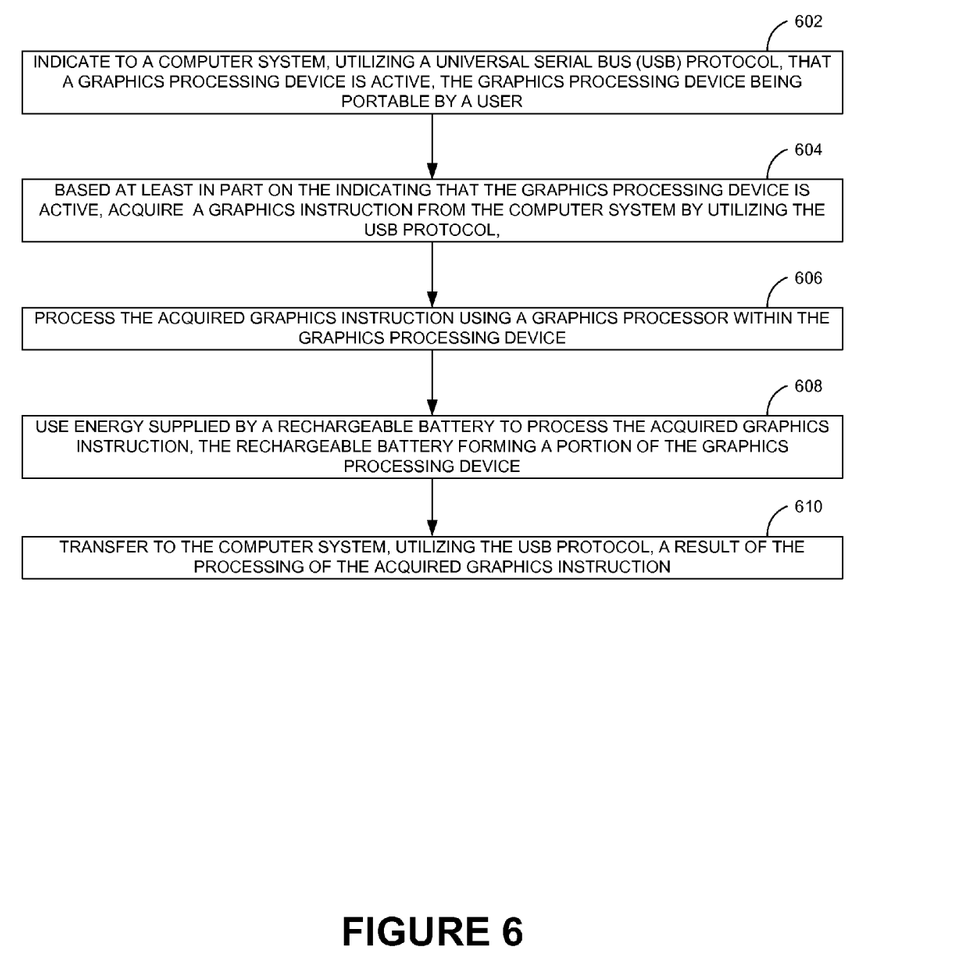
FIG. 6 is a flow diagram showing an example method for providing graphics processing, in accordance with an example embodiment.

FIG. 6 is a flow diagram showing an example method for providing graphics processing, in accordance with an example embodiment.

In one or more embodiments, operation 602 may involve indicating to a computer system, that a graphics processing device is active. In an example embodiment, the graphics processing device may be portable by a user and the indication may be made using a USB protocol. For example, referring to FIG. 2, the graphics processing device 202 may indicate to the notebook computer 204 that the graphics processing device 202 is active and ready to process graphics instructions (e.g., on behalf of the notebook computer 204). In an example embodiment, the graphics processing device 202 of FIG. 2 may provide the indication to the notebook computer 204 of FIG. 2 over the USB cable 220 of FIG. 2. In one or more embodiments, operation 604 may involve acquiring, a graphics instruction from the computer system, based at least in part on the indicating that the graphics processing device is active.

The acquisition may be made using the USB protocol. In one or more embodiments, the graphics instruction may be acquired utilizing a USB 3.0 protocol. For example, referring to FIG. 3, when the graphics instruction 222 needs to be processed, the graphics instruction 222 may be transferred from the notebook computer 204 to the graphics processor module 306 of the graphics processing device 202 through the USB interface 308 using the USB cable 220. The graphics processor module 306 may acquire the graphics instruction 222 and may decode and process graphics instruction 222.

In one or more embodiments, operation 606 may involve processing the acquired graphics instruction using a graphics processor within the graphics processing device. In one or more embodiments, operation 608 may involve using energy supplied by a rechargeable battery to process the acquired graphics instruction, the rechargeable battery forming a portion of the graphics processing device. For example, referring to FIG. 3, if the notebook computer 204 fails to power the graphics processing device 202 due to a sudden power failure during processing of the graphics instruction 222 in the graphics processing device 202, then the graphics processing device 202 may utilize energy from the battery 110 and continue to process the graphics instruction 222.

The battery 110 may be rechargeable battery. In one or more embodiments, the energy may be stored in the rechargeable battery prior to the supplying of the energy. Examples of the rechargeable battery may include, but is not limited to, a lead acid battery, a nickel cadmium (NiCd) battery, nickel metal hydride (NiMH) battery, a lithium ion (Li-ion) battery, and lithium ion polymer (Li-ion polymer) rechargeable battery, and the like. In one or more embodiments, operation 610 may involve transferring to the computer system, a result of the processing of the acquired graphics instruction.

In one or more embodiments, the result of the processing of the acquired graphics instruction may be transferred to the computer system (e.g. the notebook computer 202) using a USB protocol including, for example a USB 3.0 protocol. For example, referring to FIG. 3, once the graphics processor module 306 completes processing the graphics instruction 222, the graphics processor module 306 may indicate the completion of processing to the application interface 313 of the graphics processing device 202. The application interface 313 may associate an indication on an identifier associated with the graphics instruction 222, indicating that the graphics instruction 222 has been processed. On indicating, a result of processing the graphics instruction 224 may be transferred from the graphics processor module 306 to the USB interface 306. The application interface 313 may then permit the result of the graphics processing 224 to be transferred to the notebook computer 204 from the USB interface 306 over the USB cable 220.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a computer system and may be performed in any order (e.g., including using means for achieving the various operations). Accordingly, the specification and drawings are to be regarded in an illustrative rather than a restrictive sense.

What is claimed is:

1. A portable graphics card of a data processing device, comprising:
    a graphics processor;
    an application interface;
    a battery; and
    a Universal Serial Bus (USB) interface communicatively coupled with the graphics processor,
        the USB interface being configured to transfer a graphics instruction from the data processing device to the application interface, the data processing device being external to the portable graphics card,
    the graphics processor and the application interface together being configured to:
        in response to receiving the graphics instruction at the application interface, store in memory, by the application interface, an identifier associated with the graphics instruction,
        process, by the graphics processor, the graphics instruction on behalf of the data processing device to perform a process intensive task through the portable graphics card,
        provide, by the graphics processor to the application interface, an indication of completion of processing the graphics instruction,
        associate, by the application interface, the indication of completion of processing the graphics instruction with the identifier stored in the memory, and
        in response to associating the indication of completion with the identifier stored in the memory, transfer a result of processing the graphics instruction to the data processing device using the USB interface, and
    the battery being configured to at least partially power the graphics processor to process the graphics instruction,
    wherein the portable graphics card is implemented with a modular architecture to allow for at least one of upgrading and replacement of individual functional modules thereof without a need to entirely replace the portable graphics card, the replacement of the individual functional modules being facilitated through a capability to mix and match components of the individual functional modules, and the modular architecture being configured to utilize standard interfaces between the individual functional modules.

2. The graphics card of claim 1, wherein the USB interface utilizes a USB 3.0 protocol.

3. The graphics card of claim 1, wherein the graphics instruction is associated with a graphics application executing on the data processing device.

4. The graphics card of claim 1, wherein the battery is rechargeable.

5. The graphics card of claim 1, wherein the battery is a lithium ion battery.

6. The graphics card of claim 1, wherein the battery is user-attachable with the graphics card and user-detachable from the graphics card such that the battery is field replaceable.

7. A data processing system comprising:
    a data processing device;
    a portable external graphics card including a graphics processor, an application interface, and a battery configured to provide power to the graphics processor, the portable external graphics card being external to the data processing device, and the portable external graphics card being implemented with a modular architecture to allow for at least one of upgrading and replacement of individual functional modules thereof without a need to entirely replace the portable external graphics card, the replacement of the individual functional modules being facilitated through a capability to mix and match components of the individual functional modules, and the modular architecture being configured to utilize standard interfaces between the individual functional modules; and
    a USB module communicatively coupled with the graphics processor and configured to be communicatively coupled with the data processing device, the USB module being configured to transfer an instruction originating from the data processing device to the application interface, and
    the graphics processor and the application interface together being configured to:
        in response to receiving the instruction at the application interface, store in memory, by the application interface, an identifier associated with the instruction,
        process, by the graphics processor, the instruction on behalf of the data processing device to perform a process intensive task through the portable graphics card,
        provide, by the graphics processor to the application interface, an indication of completion of processing the instruction,
        associate, by the application interface, the indication of completion of processing the instruction with the identifier stored in the memory, and
        in response to associating the indication of completion with the identifier stored in the memory, transfer a result of the processed instruction to the data processing device using the USB module.

8. The data processing system of claim 7, wherein the portable external graphics card is configured to provide auxiliary graphics processing for the data processing device.

9. The data processing system of claim 7, wherein the instruction includes a graphics instruction associated with a graphics application executing on the data processing device.

10. The data processing system of claim 7, wherein the battery is configured to at least partially power the processor to process the instruction.

11. The data processing system of claim 7, wherein the battery is user-detachable from the portable external graphics card and user-attachable with the portable external graphics card.

12. The data processing system of claim 7, wherein the battery is rechargeable.

13. The data processing system of claim 7, wherein the battery is a lithium ion rechargeable battery.

14. The data processing system of claim 7, wherein the USB module utilizes a USB 3.0 protocol.

15. A graphics processing system comprising:
a data processing device comprising:
one or more system processors,
a memory coupled with the one or more system processors,
a video display device configured to display graphical data generated by the one or more system processors,
a first USB interface coupled with the one or more system processors, and
an audio device configured to generate audio data generated by the one or more system processors; and
a portable graphics card external to the data processing device and communicatively coupled with the data processing device using a USB cable, the portable graphics card being implemented with a modular architecture to allow for at least one of upgrading and replacement of individual functional modules thereof without a need to entirely replace the portable graphics card, the replacement of the individual functional modules being facilitated through a capability to mix and match components of the individual functional modules, the modular architecture being configured to utilize standard interfaces between the individual functional modules, and the portable graphics card including:
one or more graphics processors,
an application interface,
a rechargeable battery that is removably coupled with the one or more graphics processors and is configured to be field replaceable, the rechargeable battery being further configured to at least partially power the one or more graphics processors when the one or more graphics processors processes a graphics instruction, and
a second USB interface communicatively coupled with the one or more graphics processors and configured to communicatively couple the first USB interface with the second USB interface using the USB cable,
the second USB interface being configured to receive a graphics instruction that is encoded by a USB 3.0 communication protocol from the data processing device via the USB cable and to provide the graphics instruction to the application interface, and
the one or more graphics processors and the application interface together being configured to:
in response to receiving the graphics instruction at the application interface, store in a second memory, by the application interface, an identifier associated with the graphics instruction,
process, by the one or more graphics processors, the graphics instruction on behalf of the data processing device to perform a process intensive task through the portable graphics card,
provide, by the one or more graphics processors to the application interface, an indication of completion of processing the graphics instruction,
associate, by the application interface, the indication of completion of processing the graphics instruction with the identifier stored in the second memory, and
in response to associating the indication of completion with the identifier stored in the second memory, transfer a result of the processed graphics instruction to the data processing device using the second USB interface.

16. The graphics processing system of claim 15, wherein the one or more graphics processors include at least one multi-core processor.

17. A method comprising:
implementing a portable graphics card with a modular architecture to allow for at least one of upgrading and replacement of individual functional modules thereof without a need to entirely replace the portable graphics card;
facilitating the replacement of the individual functional modules of the portable graphics card through a capability to mix and match components of the individual functional modules;
utilizing standard interfaces for communication between the individual functional modules of the portable graphics card;
indicating to a data processing device, utilizing a Universal Serial Bus (USB) protocol, that the portable graphics card is active, the portable graphics card being portable by a user and external to the data processing device;
acquiring, utilizing the USB protocol, a graphics instruction from the data processing device, based at least in part on the indication that the portable graphics card is active, wherein an identifier associated with the acquired graphics instruction is stored in memory in response to acquiring the graphics instruction;
processing the acquired graphics instruction using a graphics processor within the portable graphics card to perform a process intensive task through the portable graphics card on behalf of the data processing device, wherein, upon completion of processing the acquired graphics instruction, an indication of completion of processing the acquired graphics instruction is associated with the identifier stored in the memory;
providing a rechargeable battery within the portable graphics card;
using energy supplied by the rechargeable battery to process the acquired graphics instruction; and
in response to associating the indication of completion with the identifier stored in the memory, transferring to the data processing device, utilizing the USB protocol, a result of the processing of the acquired graphics instruction.

18. The method of claim 17, wherein the acquiring of the graphics instruction utilizing the USB protocol includes acquiring the graphics instruction utilizing a USB 3.0 protocol, and the transferring of the result of the processing of the acquired graphics instruction includes utilizing the USB 3.0 protocol.

19. The method of claim 17, comprising:
   storing the energy in the rechargeable battery prior to the supplying of the energy.

20. The method of claim 17, wherein the battery is a lithium ion rechargeable battery.

* * * * *